(12) United States Patent
Boyer et al.

(10) Patent No.: US 6,494,656 B1
(45) Date of Patent: Dec. 17, 2002

(54) SELF-TAPPING SCREW, BLANK AND METHOD FOR JOINING THIN WORKPIECES AND PRODUCTION METHOD FOR THE SAME

(75) Inventors: Dennis O. Boyer, Newport, RI (US); Alan Pritchard, Almeria (ES)

(73) Assignee: Conti Fasteners AG, Barr (CH)

( * ) Notice: Subject to any disclaimer, the term of this patent is extended or adjusted under 35 U.S.C. 154(b) by 0 days.

(21) Appl. No.: 09/952,157

(22) Filed: Sep. 13, 2001

(51) Int. Cl.⁷ ................................. F16B 23/00
(52) U.S. Cl. ......................... 411/399; 411/416
(58) Field of Search .................. 411/411, 412, 411/416, 424, 426, 386, 387.1, 387.4, 399

(56) References Cited

U.S. PATENT DOCUMENTS

| | | | |
|---|---|---|---|
| 3,949,641 A | | 4/1976 | Masuda |
| 3,978,760 A | * | 9/1976 | Muenchinger ............... 411/386 |
| 4,114,508 A | | 9/1978 | Jeal |
| 4,486,135 A | * | 12/1984 | Kazino ........................ 411/387 |
| 4,820,098 A | * | 4/1989 | Taubert et al. ............... 411/411 |
| 5,061,135 A | | 10/1991 | Pritchard |
| 5,356,253 A | * | 10/1994 | Whitesell ..................... 411/188 |
| 5,599,149 A | | 2/1997 | Clemente |
| 5,722,808 A | | 3/1998 | Pritchard |
| 5,772,374 A | * | 6/1998 | Ide et al. ..................... 411/386 |
| 5,921,735 A | * | 7/1999 | Hughes ........................ 411/411 |
| 6,089,806 A | | 7/2000 | Reynolds et al. |
| 6,340,277 B1 | * | 1/2002 | Koenig et al. ............... 411/416 |

OTHER PUBLICATIONS

U.S. pending patent application entitled, "Self–Tapping Screw and Method for Joining Thin Workpieces" by Alan Pritchard, filed Sep. 13, 2001. Atty. Docket No.104157–0070.

* cited by examiner

Primary Examiner—Flemming Saether
Assistant Examiner—Jori Schiffman
(74) Attorney, Agent, or Firm—Cesari and McKenna, LLP; William A. Loginov, Esq.

(57) ABSTRACT

A headed multi-lobed blank, method of manufacturing a self-tapping screw from the blank, and resulting multi-lobed self-tapping screw for joining thin workpieces provides desirable thread-forming characteristics at the conical tip and body portions, and improved resistance to vibrational loosening near the head. The resulting screw, obtained from the blank and method, incorporates a threaded tapered root portion between the screw head and body portion having a cross section that varies from nearly circular in the area adjacent to the underside of the head to a maximum out-of-round (or lobular) cross section at the intersection of the tapered root portion and the screw body. This shape, combined with a thread profile outer diameter that remains largely constant from the body portion through the tapered root portion, and a multiple coil (lead thread) shape, ensure more secure holding of the screw in a thin anchor material—with the anchor material extruded axially forward and backward around the root portion.

6 Claims, 6 Drawing Sheets

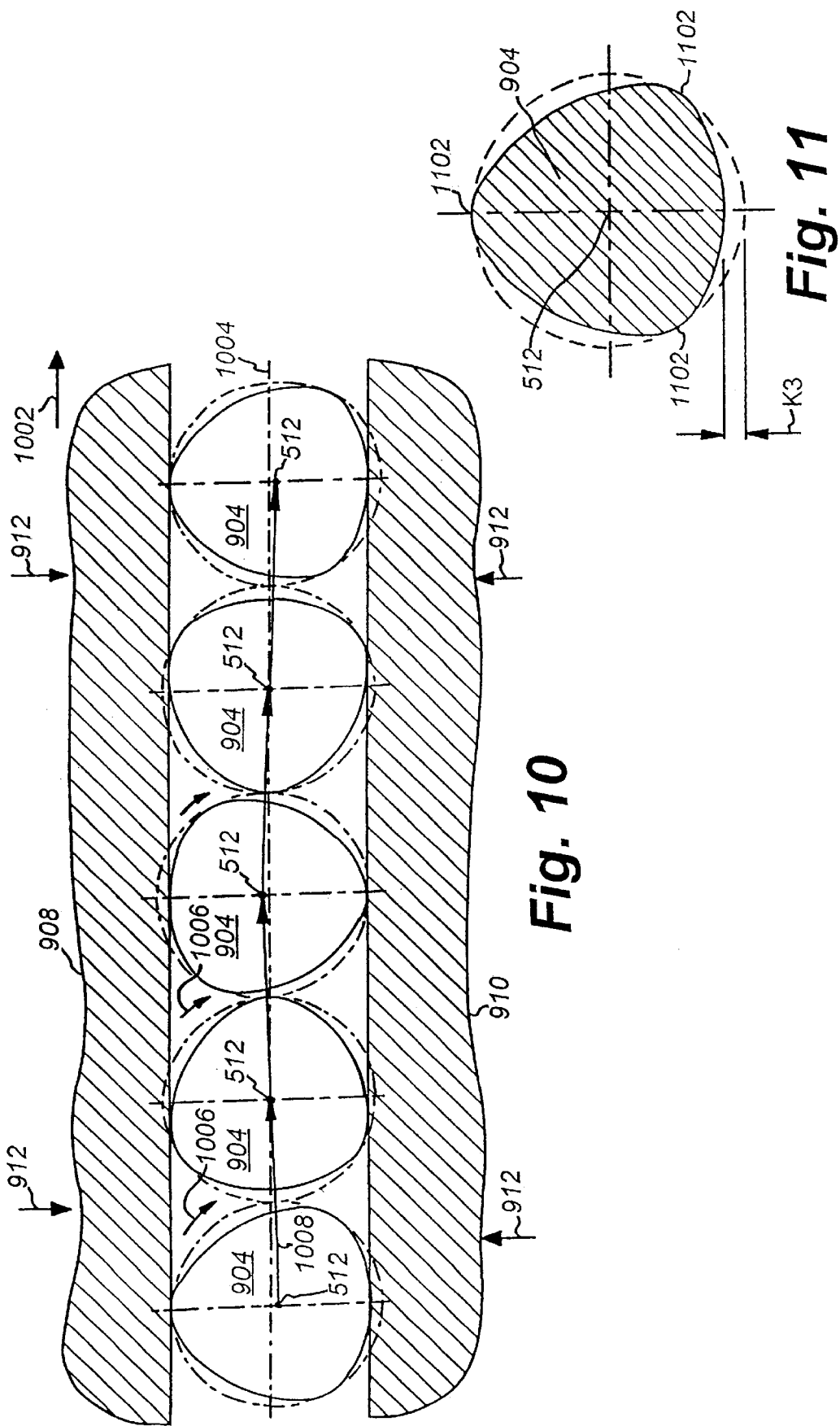

SELF-TAPPING SCREW, BLANK AND METHOD FOR JOINING THIN WORKPIECES AND PRODUCTION METHOD FOR THE SAME

RELATED APPLICATION

This application is related to U.S. patent application Ser. No. 09/952,091 entitled SELF-TAPPING SCREW AND METHOD FOR JOINING THIN WORKPIECES, by Alan Pritchard, filed on even date.

FIELD OF THE INVENTION

This invention relates to self-tapping screws, and more particularly to self-tapping screws, blanks for self-tapping screws and methods for forming self-tapping screws using appropriate roll-forming dies.

BACKGROUND OF THE INVENTION

It is recognized by those skilled in the art that conventional self-tapping screw products, when used to assemble thin sheet metal components, have limited reliability in service due to problems associated with a need to restrain the screw tightening torque to small relative values. This needed restraint on the tightening torque is required to minimize the potential for the anchor to strip during assembly and thereby cause the screw to spin. The anchor material is that part of the joined assembly farthest removed from the underside of the screw head. Stripping and spinning will cause a loss in assembly clamp load and subsequent deterioration of the assembly.

FIG. 1 shows a commonly encountered disadvantage of a self-tapping screw 102 that has a conventional single start thread used to join thin sheet metal components 104 and 106 into a joined assembly. The screw contains a conventional circular cross-section.

When the screw anchor material 106 (also termed a "nut member"), which is the material furthest from the head of the screw, is of a width 108 equal to or less than the axial pitch 110 of the screw (defined generally herein as a "thin" workpiece), the leading face 112 of the coil or thread typically deflects the anchor material 106 such that the material follows the space between adjacent coils, scrolls or threads. This type of anchor material and assembly may not produce the most effective joint clamping load. In addition, inadequate thread mating contact results.

In order to overcome certain disadvantages of the single-start-thread design, when used to join thin materials, a true circular-cross-section screw having multi-lead threads that are generated around a headed blank has most recently been employed. The use of a multi-lead thread tends to better capture the anchor material, preventing the anchor material from becoming trapped between threads by providing more distributed engagement of multiple locations on the perimeter of the anchor material pilot hole.

However, even the use of multiple lead threads is not a complete solution, when taken alone. Notably, FIG. 2 shows a continuing drawback associated with conventional screws for joining thin workpieces, having either single or multi-lead threads (either circular or non-circular in cross section). The exemplary screw 200 maintains a parallel core diameter 202 as close as possible to the underside 204 of the screw head 206. This implementation can cause a reduction in the performance of the assembly. Manufacturing constraints generally create an under-filling of the screw thread crests adjacent to the underside 204 of the screw head 206, thereby creating an unspecified and non-controllable reverse thread taper 208. As such, the thread crests closer to the screw entry point are of a greater diametrical magnitude than the thread crests that are closer to the head. The reverse thread taper 208 has the disadvantage of producing a gap 210 between the internal and external mating threads of the assembly. This gap 210 has the effect of reducing mating thread contact in the essential area of the jointed structure and will result in assembly break down under lower than expected application torque.

The use of a circular cross section screw (as described above) has been heretofore preferred. While certain advantages in thread formation may be achieved using a non-circular cross-section screw, in general, it has been considered detrimental to the assembly to use a non-circular cross section—such as a commercially available roll-forming, self-tapping, multi-lobed screw. Such non-circular cross sections are viewed as lacking the necessary resistance strength to applied torque when joined into the assembly.

Accordingly it is an object of this invention to provide a self-tapping screw and an associated method for forming such a screw using a non-circular cross-section blank, thus producing a predominately multi-lobe screw with advantageous thread-forming properties, and a desirable multi-lead thread. This screw should, nevertheless, exhibit good resistance to vibrational loosening as the material relaxes between lobes notwithstanding the use of a generally non-circular cross section in the "joint clamp zone" of the joined assembly.

SUMMARY OF THE INVENTION

This invention overcomes the disadvantages of the prior art by providing a headed multi-lobed blank, method of manufacturing a self-tapping screw from the blank, and resulting multi-lobed self-tapping screw for joining thin workpieces that exhibits desirable thread-forming characteristics at the conical tip and body portions, and improved resistance to vibrational loosening near the head. The resulting screw, obtained from the blank and method, incorporates a threaded tapered root portion between the screw head and body portion having a cross section that varies from nearly circular in the area adjacent to the underside of the head to a maximum out-of-round (or lobular) cross section at the intersection of the tapered root portion and the screw body. This shape, combined with a thread profile outer diameter that remains largely constant from the body portion through the tapered root portion, and a multiple helical coil (lead thread) shape, ensure more secure holding of the screw in a thin anchor material—with the anchor material extruded axially forward and backward around the root portion.

The headed blank is formed, in one embodiment, by striking a generally circular or lobular-cross-section wire or rod into a die cavity of a header die. As the wire or rod is driven into the header cavity, it is plastically deformed into the desired finished blank having four sections—the head, the conical entry section, the body section and the tapered portion. The die cavity has an appropriate cross section so that the body section and conical entry point section of the finished blank is formed with a multi-lobed cross section, while the tapered portion, adjacent to the head, has an essentially circular cross section.

To form the threaded lobular screw, the finished blank is engaged by laterally moving, roll-forming dies that apply sufficient pressure to cause plastic deformation of the blank surface. The dies are maintained at an equal distance, which causes, due to the lobular cross section of the blank, an oscillating rolling rotation in the blank as one of the dies moves laterally relative to the other. This roll-forming process, in the area of the tapered root portion, creates a thread pattern that maintains an approximately constant outer diameter with respect to the body portion, but the inner (root) diameter (the valleys of each of the threads) continually tapers outwardly toward the head. In addition, the tapered root portion is provided, in this manner, with the desired maximum out-of-round near the body section and a near-circular cross-section adjacent to the underside of the head. This out-of-round variation along the tapered root portion results from the reduced forming pressure present in the larger diameter area near the head.

A screw formed in accordance with this invention provides a novel tapered root portion, adjacent to the head, having a varying cross section that creates mechanical resistance to loosening from the effects of vibration or other external forces as the material being joined by the screw relaxes between the lobes.

BRIEF DESCRIPTION OF THE DRAWINGS

The foregoing and other objects and advantages of the invention will become clearer with reference to the following detailed description as illustrated by the drawings in which:

FIG. 10 is a cross section of the headed blank in the forming dies, at different points along a rolling path, taken generally along the body portion in the vicinity of line 11—11 of FIG. 9;

FIG. 11 is a cross-sectional view of the body portion of the formed screw, resulting from the roll-forming process of, taken along line 11—11 of FIG. 9;

DETAILED DESCRIPTION OF THE ILLUSTRATIVE EMBODIMENTS

I. General Principles

Figure 1:
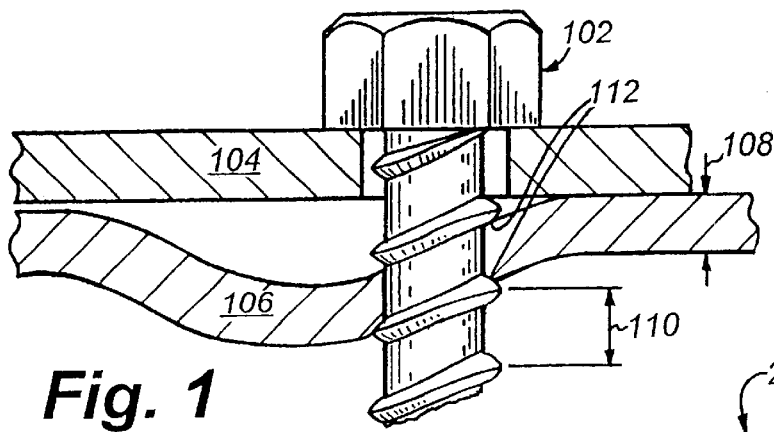
FIG. 1, already described, is a partial side cross section showing an example of anchor material deflection when using a conventional single-lead-helical-thread on a screw.
Figure 2:
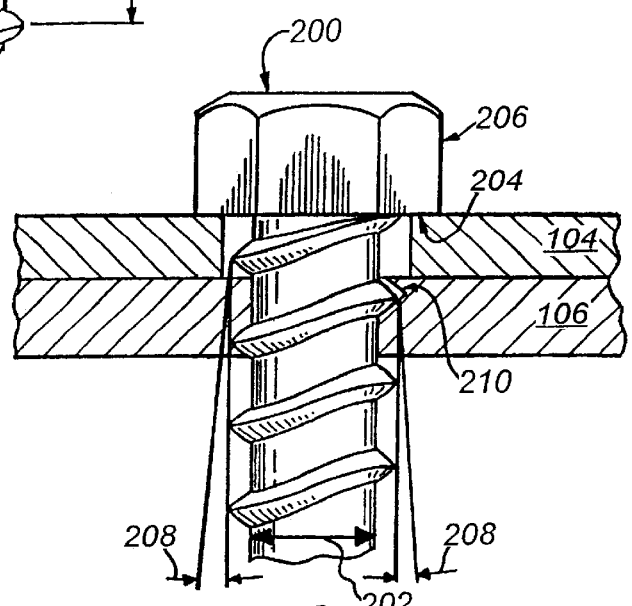
FIG. 2, already described, is a partial side cross-section showing the creation of a reverse-thread taper associated with manufacturing constraints by having a parallel screw thread root core diameter along the full length of a screw.
Figure 3:
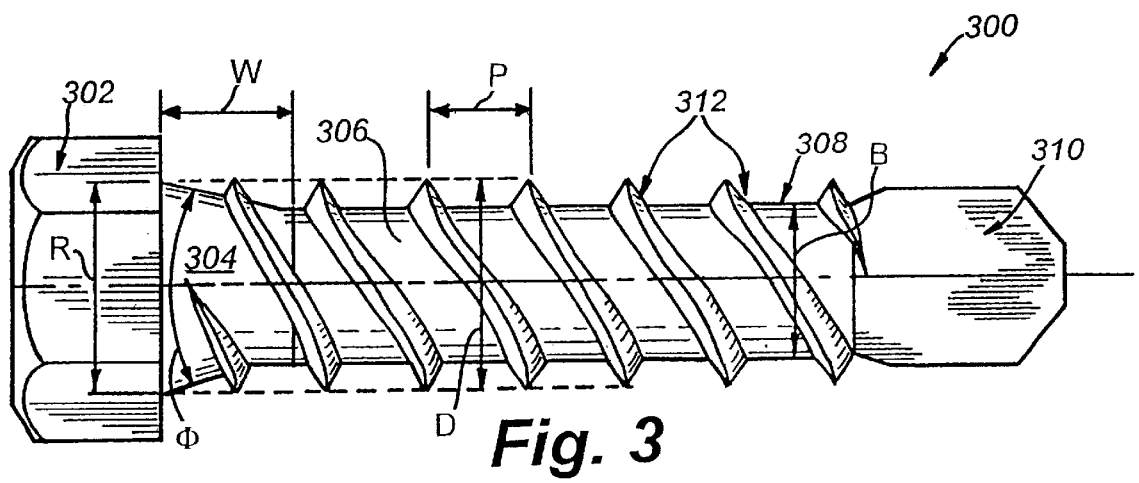
FIG. 3 is a side view of a self-tapping screw having an exemplary tapered root portion for improved vibration resistance and hold strength in thin materials.

By way of further background, FIG. 3 illustrates an exemplary screw 300 that generally avoids certain disadvantages associated with a reverse thread taper adjacent the head, and therefore, increases hold strength and resistance to vibrational loosening. This screw, and other related embodiments thereto, are described in commonly owned U.S. patent application Ser. No. 09/952,091 entitled SELF-TAPPING SCREW AND METHOD FOR JOINING THIN WORKPIECES, by Alan Pritchard, filed on even date, the teachings of which are expressly incorporated herein by reference. Briefly, the screw 300 includes a head 302, a tapered root portion 304 (tapering radially outwardly in a direction along the body taken toward the head 302), a central body portion 306, a tapering entry portion 308 and an exemplary entry point 310 (such as a self-drilling point).

The body of the screw 306 has disposed along its outer periphery, a plurality of continuous helical coils, scrolls or threads 312. The screw thread (helical coils) has an outer diameter D. In one embodiment the magnitude of D can lie within the range of 1.6–10 mm. However, this and other ranges specified herein are only exemplary of a typical application of the screw according to this invention. The principles described herein can be applied to screws, and corresponding materials, of any type and/or size.

In one embodiment, there are two separate continuous helical coils, scrolls or threads (also termed "multiple lead threads") disposed along the body 306, such that the screw is of a twin or double lead type, but it is expressly contemplated that other numbers of separate threads could be utilized. In this embodiment, the use of a plurality of threads works to further prevent anchor sheet deformation. Note that the term "thread" as used herein could refer to either the overall continuous formation or formations, winding helically along the cylindrical shaft or body, or the individual profile peak-and-valley formations on a cross section of the screw. The context in which the term is used should assist the reader in differentiating between the two uses of the general term.

Figure 14:
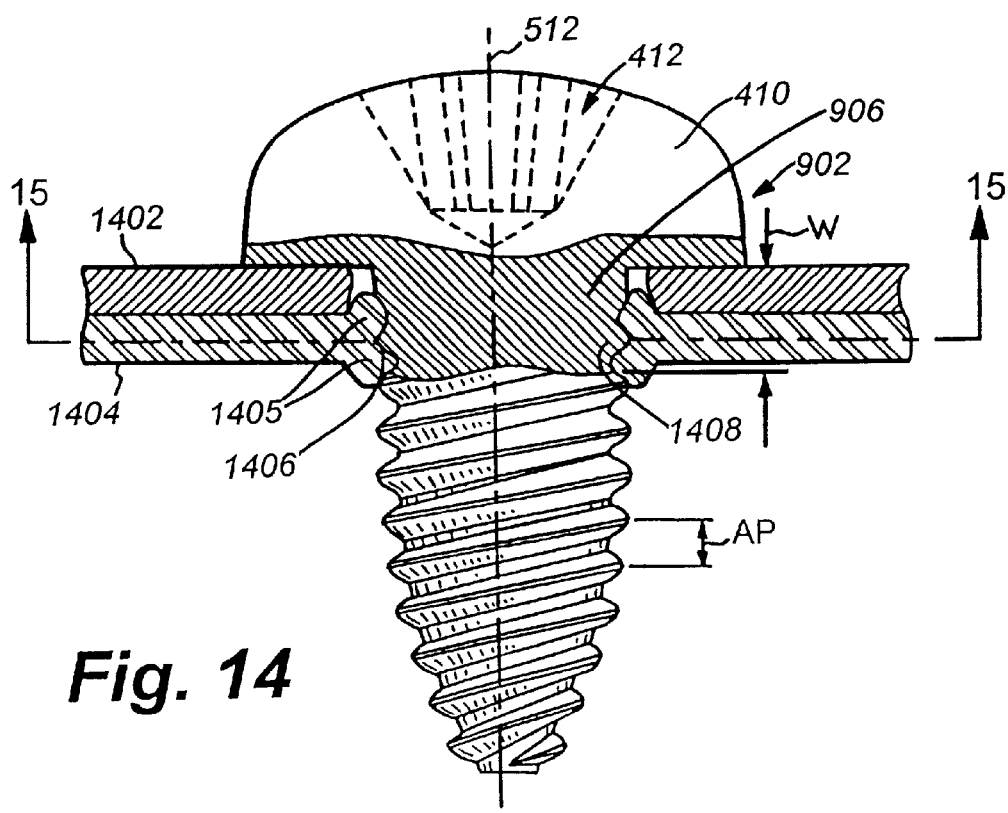
FIG. 14 is a partial side cross section of a completed screw, formed in accordance with FIG. 9, joining a pair of thin material sheets.

In an illustrative embodiment, the inventive tapered root portion 304 of the screw, which is located axially between the head 302 and the body 306 of the screw, has an axial length W of at least two, and preferably no more than approximately 3.5 times the axial pitch P (see also the width W, for example, in FIG. 14). The tapered root portion 304 has a maximum diameter R adjacent to the head 302, tapering downward to a diameter equal to the screw thread root diameter B. Angle φ is the included angle that the root taper portion 304 forms with respect to body 306. The angle φ should be between approximately 6° and 15°, preferably between 8° and 10°.

The threads 312 are disposed on the tapered root portion 304, such that the outer diameter D of the screw and threads is of approximately the same magnitude along the tapered root portion 304 and the body of the screw 306. While it is sometimes preferable that all threads between the head (including the tapered root portion) and the entry point region be of approximately the same outer diameter, it is contemplated that alternate embodiments may employ a different thread diameter and profile in a region closer to the entry point and more remote from the tapered root portion to derive certain beneficial effects in connection with specific workpiece thickness and materials. Accordingly, it is contemplated that the threads have approximately the same diameter in the tapered root portion and a part of the screw body directly adjacent the tapered root portion (the adjacent part extending from the tapered root portion for at least a distance of four times the thread pitch toward the entry point).

II. Lobular Blank Formation

The principles described above (e.g. a tapered root portion and multi-lead thread) can be applied generally to a screw having a multi-lobed thread-forming cross section. Such a multi-lobed cross section consists generally of an odd number of lobes (e.g. 3, 5, 7, etc.) that define an out-of-round (non-circular) perimeter. In general, when a lobular screw is driven into an appropriately sized pilot hole, the lobes plastically deform the material to create roll-formed threads. These threads maintain a certain degree of spring-back following formation, thereby exerting a holding pressure on the screw that advantageously reduces vibrational loosening. One example of a multi-lobed cross-section, having three such lobes, is the Trilobular™ line of self-tapping screws developed by, and available through, Research Engineering and Manufacturing Inc. of Middletown, R.I. and Conti Fasteners AG of Switzerland.

Figure 4:
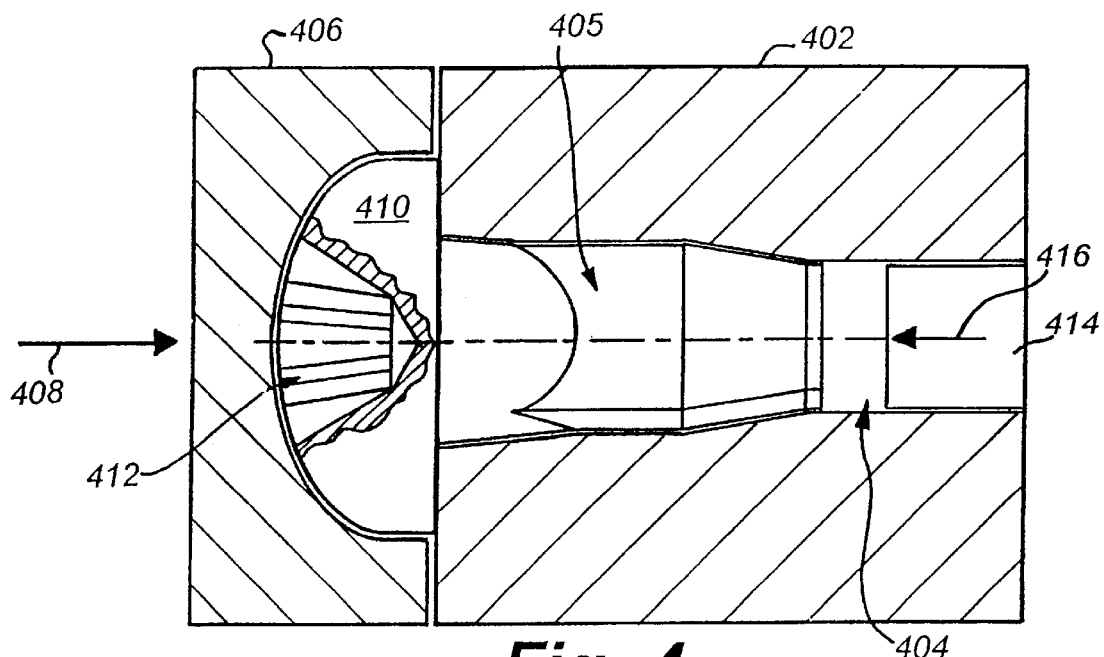
FIG. 4 is a partial side cross section showing the formation of a headed blank according to an embodiment of this invention.

The formation of a cold-headed blank, which is used to eventually form a finished screw in connection with an embodiment of this invention, is shown generally in FIG. 4. This blank is typically a three-lobed-cross-section blank, although the use of other numbers of lobes are expressly contemplated. A hard header die 402 having a forming die cavity 404 is shown. The formation process typically starts when a cut-off piece of generally circular or lobular-cross-section wire or rod of predetermined size is placed into the die cavity. Often, three or more different die cavities representing different stages of formation are employed in a line, with the blank moved progressively from one die cavity to another. In the illustrated example, the final forming die 402 is shown. The die cavity 404 is a dimensioned hole that conforms to the desired finished blank shape. The die cavity 404 has sidewalls of sufficient thickness and hardness to ensure that no deformation of the die cavity occurs as a unfinished blank is driven thereinto to be plastically deformed into the desired finished blank 405 as shown. The transverse cross section of the die cavity 404 (not shown), of course, defines the desired blank cross section—either circular or multi-lobular perimeter as described in further detail below).

Formation of the finished blank 405 in the die cavity 404 often occurs in several strikes applied by a ram or punch 406. The exemplary punch 406 is typically driven by a powerful mechanical actuator (not shown) that strikes the blank under great pressure (see arrow 408) to cause both the blank head and finished internal blank shape to be formed simultaneously. Like the progressive die cavities, several differently shaped punches can be used during formation of the blank 405, each with a shape that conforms progressively more closely to that of the finished blank head 410. In this example, the blank head 410 includes a Phillips drive formation 412 (shown in exposed cross-section). However, the drive formation may be of any desired shape, and may alternatively comprise (for example) a standard recessed cross slot, a six-lobed drive recess, a hexagon socket recess. The blank may otherwise be provided with any external or internal wrench engaging drive-head form, or may contain any other system that will allow torque to be transmitted to the screw through a suitable and appropriate system. Note that a movable knockout pin 414 can be used to stop the tip of the blank, and to eject the finished blank (see arrow 416) into a channel or other conveyance (not shown), leading to a thread-forming die (to be described below).

Figure 5:
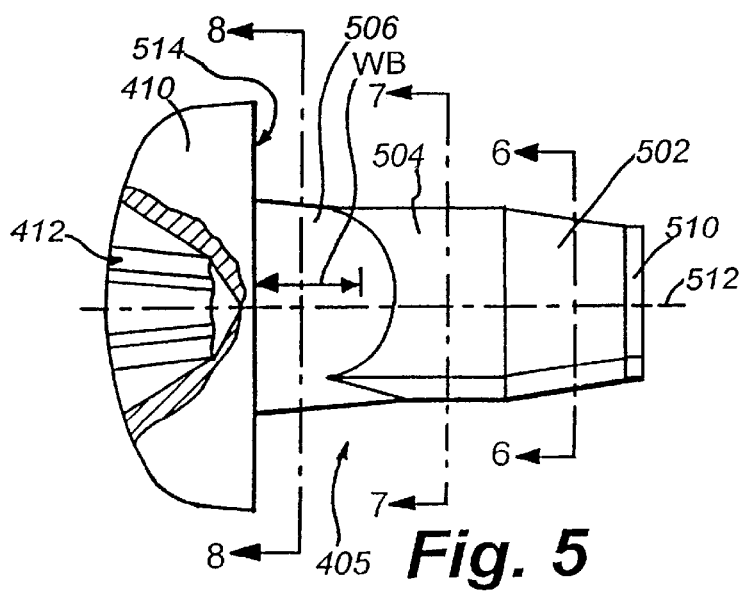
FIG. 5 is a side view of a headed blank formed in accordance with the blank-formation embodiment of FIG. 4.

The die cavity 404 generates at least four distinctly shaped blank sections according to the various embodiments of this invention. With reference now to FIG. 5, these sections of the finished cold-headed blank 405 are shown and described in further detail. According to an illustrative embodiment, the sections include a conical point (or "entry") section 502, a body section 504 and a tapered portion 506 adjacent to the head 410, and the head itself.

Figure 6:
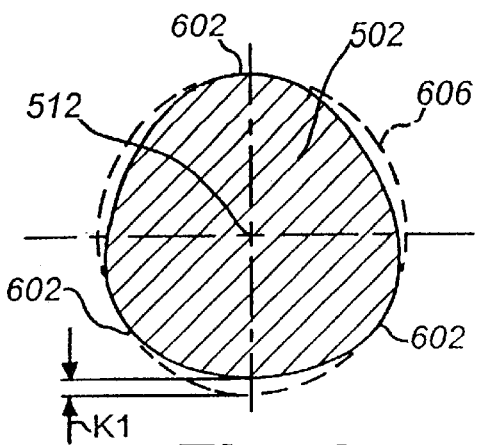
FIG. 6 a cross-sectional view of the conical point portion of the headed blank taken along line 6—6 of FIG. 5.
Figure 7:
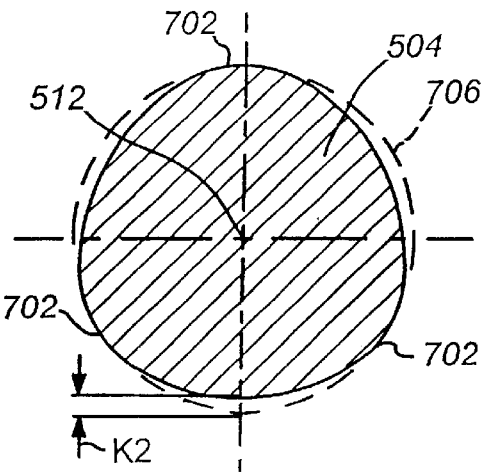
FIG. 7 a cross-sectional view of the body portion of the headed blank taken along line 7—7 of FIG. 5.
Figure 8:
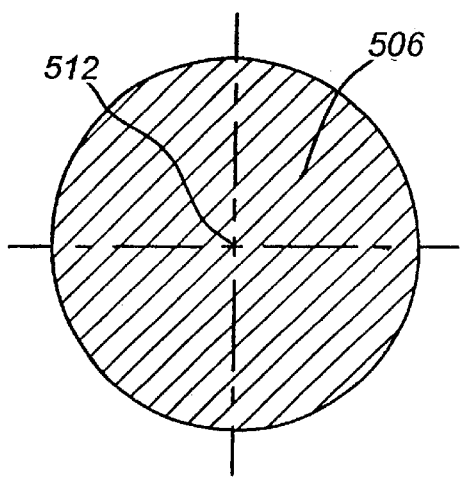
FIG. 8 a cross-sectional view of the tapered portion of the headed blank taken along line 8—8 of FIG. 5.

The general cross sections present at the conical point section 502, body section 504 and tapered portion 506 are described, respectively in FIGS. 6, 7 and 8. In general, the screw blank defines a continuously tapering shape from the tip 510 to the head 410. The three-lobed cross-section shape that characterizes the exemplary blank is shown more clearly in the cross-sectional views of FIGS. 6 and 7 (see lobes 602 and 702, respectively). The lobes 602, 702 are centered around the axis 512, and fall within respective coaxial circles 606 and 706 (shown in phantom). The "valley" regions between lobes 602, 702 are spaced at an out-of-round spacing K1 and K2 (respectively). As described herein the greater the "out-of-round," the greater the value K. This can also be termed the degree of "lobularity" in accordance with the teachings of this invention.

Similarly, FIG. 8 shows a cross section taken transversely across the approximate axial midpoint of the tapered portion 506. This cross section, centered around the axis 512 is essentially circular, representative of the circular profile along this portion. Referring also to FIG. 5, the tapered portion 506 tapers outwardly as it approaches the underside 514 of the head 410 from the body section 504. The degree of increase in the taper is generally no less than twice the axial pitch of the screw thread (refer to pitch AP in FIG. 14) when formed, and is preferably no longer in the axial direction than a value WB that is three and one half times the axial pitch (AP) of the formed thread.

III. Thread Formation

Figure 9:
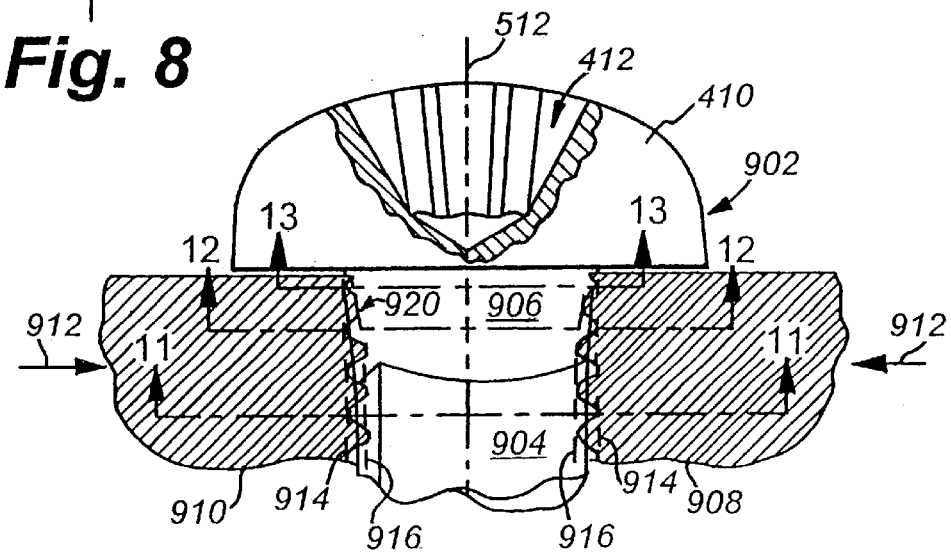
FIG. 9 is a partial side cross section of the resultant formed screw, from the headed blank of FIG. 5, engaged by thread-forming dies according to an embodiment of this invention.

FIGS. 9 and 10 generally detail the formation of threads on the blank 405 to create the completed, threaded screw (denoted herein as 902). In this embodiment, the screw 902 is engaged by flat roll-forming dies 908 and 910 along the shaft of the blank just below the head 410. These dies apply sufficient pressure (arrows 912) to cause plastic deformation (and material flow) of the blank surface in each of the three sections (502, 504 and 506) as one of the die plates 908 is moved laterally (arrow 1002) with respect to the other die plate 910. During die plate movement, the spacing between die plates is maintained as a constant as shown by the equidistant center line 1004 between the confronting die forming surfaces. Because the dies engage an eccentric cross section blank, the movement of the die 908 causes a rolling rotation (arrows 1006) in the blank that oscillates. Specifically, the center axis 512 of the rolling blank/screw traces a path 1008 that extends alternately above and below the center line 1004. Since the distance between dies is constant, however, a measurement of the cross section using a flat anvil micrometer would tend to show constant dimensions about the entire circumference of the finished threaded screw.

Referring particularly to FIG. 9, the dies 908 and 910, in the area of the formed tapered root portion 906 are provided with a characteristic outward taper 920. This outward taper, acting upon the tapered portion of the blank creates a resulting thread pattern with thread profile peaks that maintain a relatively constant outer diameter (dashed lines 914)

with respect to the thread peaks in the body portion 904, but the inner diameter (the valleys of each thread profile), as denoted by dashed line 916, exhibit a characteristic continual outward taper toward the head 410. The continuous taper is generated in large part by the action of the moving dies 908, 910 upon the rolled blank. Additionally, the flow of blank material, based upon the die shapes causes a more continuous appearance shown in FIG. 9 (and FIG. 15 to be described below). This outwardly tapered shape stands in direct contrast to the undesirable underfilling near the head typically found in the prior art.

Figure 12:
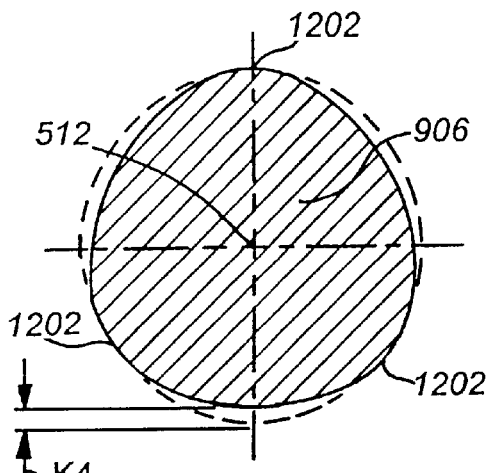
FIG. 12 is a cross-sectional view of the tapered root portion of the formed screw at a location adjacent to the body portion, taken along line 12—12 of FIG. 9.
Figure 13:
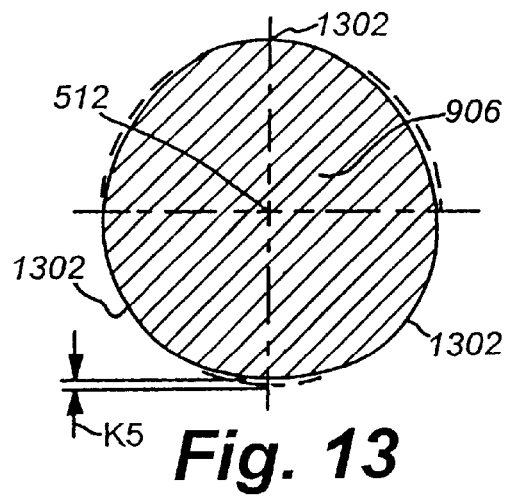
FIG. 13 is a cross-sectional view of the tapered root portion of the formed screw at a location adjacent to the head, taken along line 13—13 of FIG. 9.

Reference is now made to the cross sections for the rolled screw 902 shown in greater detail in FIGS. 11–13. Referring first to FIG. 11, the body portion 904 shows the greatest out-of-round value K3 between lobes 1102 and intervening "valleys."

The cross section of FIG. 12, which details a part of the now-threaded tapered root portion 906 adjacent to the body 904 shows a decreased out-of-round value K4 between lobes 1202 (but still a significant out-of-round value). It is understood generally that the rolling die applies reduced pressure in proportion with the increase in the taper (as the taper approaches the underside 514 of the head). Accordingly, a relatively small out-of-round value K5 is exhibited for the cross section FIG. 13, relatively near the underside of the head. This small (minimal) out-of-round cross section shall be termed a "near-circular cross section" for the purposes of this description. In some embodiments, the near-circular cross section can be essentially circular. Thus the term should be taken to include such an alternative.

Clearly, the above-described oscillatory rolling movement of the blank, under the influence of the roll-forming dies, tends to influence the final formation of the tapered circular cross section adjacent the underside of the head. It should also be clear that the blank and thread forming die combination employed herein results in a screw that has the advantageous thread-forming characteristics of a multi-lobed screw with the increased resistance to vibrational loosening associated with a screw having a circular cross section in the region of the joint clamp zone. This near-circular cross section is generated, in part, as a result of the tapered root portion that advantageously reduces forming pressure in that region.

IV. Joint Assembly

As detailed in FIG. 14, the finished, rolled screw 902 joins together an assembly consisting of a first thin workpiece 1402 and a second, anchor material workpiece 1404. The head 410 firmly compresses against the first workpiece 1402. As shown, two or more separate helical coils, scrolls or lead threads 1406, 1408 have been formed on the screw 902. These are represented by the diametrically opposed thread profiles 1406, 1408 located at the same axial position along the screw shaft. As noted above, the finished screw is of any lobular cross-sectional area (3,5,9,11, etc. lobes). Note that the tapered root portion 906 engages and extrudes (see extrusion points 1405) the anchor material 1404 in a forward and backward manner that provides additional thread engagement between the anchor material 1404 and threads 1406, etc. The extrusion occurs, in part because, the valleys of the threads in the tapered root portion taper outwardly toward the head, while the peaks of the threads remain largely the same diameter as those of at least the adjacent portion of the body section (and become more-fully circular in cross section near the head). Thus, as the screw is tightened into the thin anchor material 1404, the material becomes increasingly compressed against the tapered root thread valleys to the point of flowing axially backward and forward, as shown.

To reiterate, the use two or more opposed coils or lead threads means that multiple points along a given cross section of the anchor material are secured. This securement is accomplished in the area of the tapered root portion, extending between the near-circular cross section and the more out-of-round cross section, thereby enhancing resistance to loosening from vibration and other external forces. In the completed screw, the threads 1406, 1408 etc. define an axial pitch AP, which is the distance between crests of adjacent threads. As discussed above in reference to FIG. 5, the length of the tapered root portion WB is at least twice that of the axial pitch AP according to one embodiment. In another exemplary embodiment, the tapered root portion length WB is no more than 3.5 times the axial pitch AP.

Figure 15:
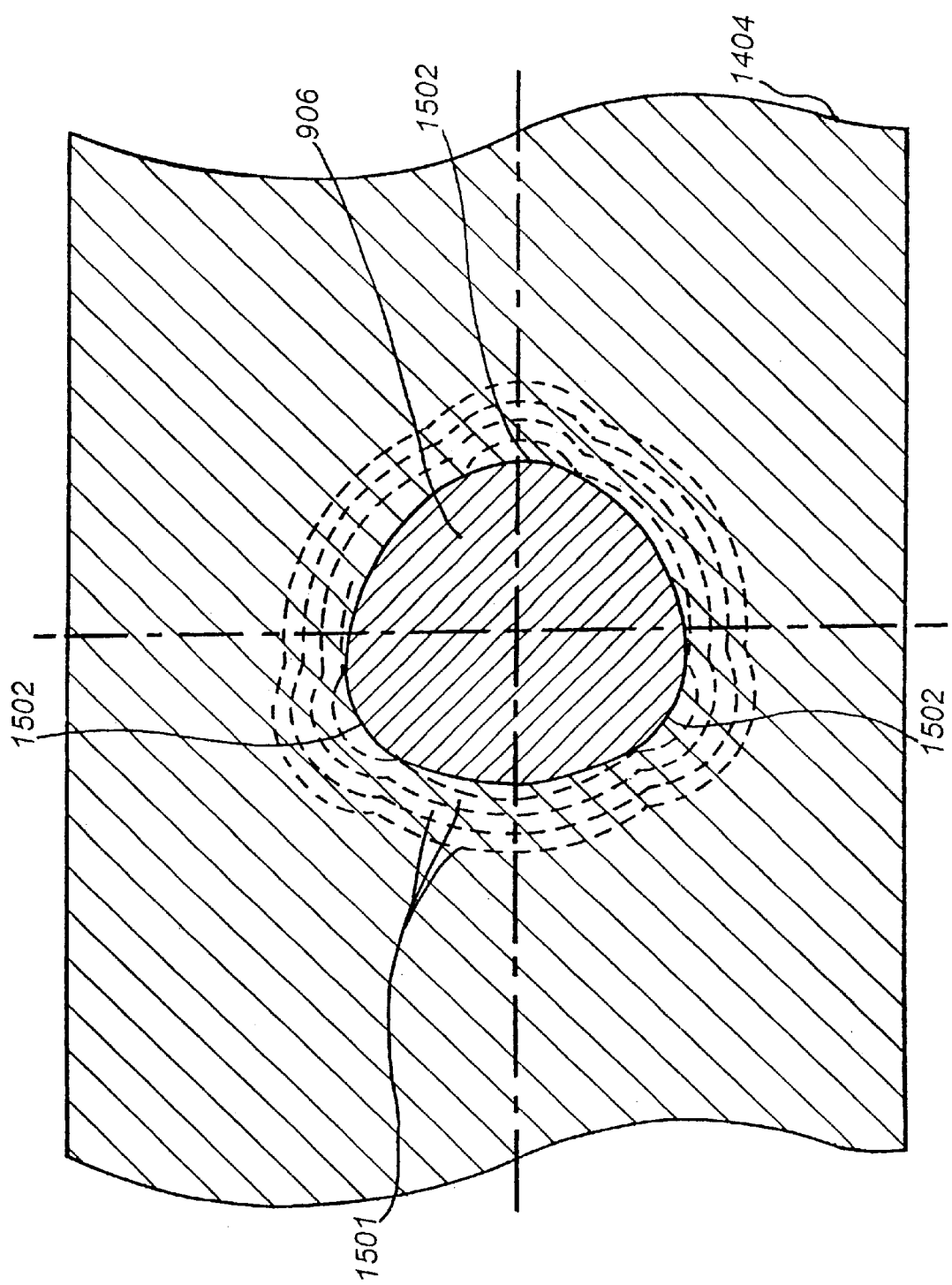
FIG. 15 is a cross-sectional view of the stress patterns generated by the screw in the anchor material taken along line 15—15 of FIG. 14.

The effects of the force distribution through a cross section of the anchor material 1404 are shown in greater detail in FIG. 15. Specifically, the screw's tapered root portion 906 resides within the anchor material 1404 so as to generate a stress pattern categorized by a series of stress lines 1501 that reveal a stress gradient concentration in the vicinity of each of the lobes 1502. Note that three lobes 1502 are shown in this example.

The alternating relaxed regions of stress and concentrated reasons of stress enhance the mechanical resistance of the fastener to loosening from the material based upon vibration or other external forces.

The foregoing has been a detailed description of certain embodiments of the invention. Various modifications and additions can be made without departing from the spirit and scope thereof. For example, self-tapping thread design can be varied, and an alternate thread-forming profile can be substituted in an alternate embodiment. Likewise, the number continuous helical coils or threads, and the like can be widely varied. Further, the materials and hardness of the screw, as well as the material of the underlying anchor sheet can be varied. Accordingly, where and when necessary, the screw materials are treated so that they will be capable of withstanding (without failure) the applied torque when engages with specified anchor materials of a predetermined type. Such treatments can include Case hardening and/or induction point hardening. Accordingly, this description is meant to be taken only by way of example, and not to otherwise limit the scope of the invention.

What is claimed is:

1. A threaded screw for joining thin workpieces, the screw having a plurality of lead treads formed about a defined center axis and a head, in which the first workpiece overlies the second workpiece and the second workpiece defines a thin anchor material, comprising:

a body section defining a multi-lobed cross section;

a conical point section defining a multi-lobed cross-section;

a tapered root portion located directly adjacent to the head, and the tapered root portion being between the head and the body section, the tapered root portion defining a varying cross section, the varying cross section ranging from a near circular cross section adjacent to the head to a multi-lobed cross section adjacent to the lobular body; and wherein each of the body section, the conical point section and the tapered root portion are adapted to extend from the head along the center axis through the first workpiece and through the second workpiece so that the lead threads engage the second workpiece to force it into compression against the first workpiece and the head with the tapered root portion engaging the second workpiece.

2. The threaded screw of claim 1 further wherein the plurality of lead threads have a set thread profile disposed along the conical point section, the body section and the tapered root portion such that a measurement through the center axis about an entire circumference around the center axis is constant to a crest of each of the threads is maintained along both the tapered root portion and at least a portion of the body section adjacent to the tapered root portion.

3. The threaded screw of claim 2, wherein a distance between crests of adjacent threads measured along the axis of rotation defines an axial pitch and the tapered root portion has an axial length of at least twice the axial pitch.

4. The threaded screw of claim 2, wherein a distance between crests of adjacent lead threads measured along the axis of rotation define an axial pitch and the tapered root portion has an axial length of no more than 3.5 times the axial pitch.

5. A method for joining at least a first workpiece and a second workpiece that overlies the first workpiece and that defines a thin anchor material using a threaded screw having treads formed about a defined center axis and comprising a body section defining a multi-lobed thred-forming cross-section, a tapered root portion located directly adjacent to the head, and the tapered root portion being between the head and the body section, the tapered root portion defining a varying cross section ranging from a near-circular cross section adjacent to the head to a multi-lobed cross section of maximum lobularity adjacent to the body section, a conical point section defining a multi-lobed thread-forming cross-section, a lead thread having a set thread profile disposed along the screw body and along the tapered root portion such that a constant radial distance from the axis of rotation to a crest of each of the threads is maintained along both the tapered root portion and at least a portion of the body section adjacent to the tapered root portion, the method comprising the steps of:

rotating the screw while applying pressure along the axis of rotation in the direction of the first workpiece and the second workpiece so that the lead thread engages the second workpiece at the tapered root portion and force the second workpiece into compression with the first workpiece and the head; and providing resistance to loosening from external forces as the first thin workpiece relaxes between the multi-lobed cross section defined by the tapered root portion.

6. A method for joining at least a first workpiece and a second workpiece that overlies the first workpiece and that defines a thin anchor material using a threaded screw having threads formed about defined center axis and comprising a body section defining a multi-lobed thread-forming cross-section, a tapered root portion located directly adjacent to the head, and the tapered root portion being between the head and the body section defining a varying cross section ranging from a near-circular cross section adjacent to the head to a multi-lobed cross section adjacent to the body section, a conical point section defining a multi-lobed thread-forming cross-section, a plurality of threads having a set thread profile disposed along the screw body and along the tapered root portion such that a constant radial distance from the axis of rotation to a crest of each of the threads is maintained along both the tapered root portion and at least a portion of the body section adjacent to the tapered root portion, the method comprising the steps of:

rotating the threaded screw around the axis of rotation while applying pressure in the direction of the first workpiece and the second workpiece so that the threads engage the second workpiece at the tapered root portion and force the second workpiece into compression with the first workpiece and the head;

forming a series of internal threads in the second workpiece by the threads disposed along the screw body; and providing resistance to loosening from external forces as the first thin workpiece relaxes between the multi-lobed cross section defined by the tapered root portion.

* * * * *